US 8,466,979 B2

(12) United States Patent
Choi et al.

(10) Patent No.: US 8,466,979 B2
(45) Date of Patent: Jun. 18, 2013

(54) DIGITAL IMAGING PROCESSOR AND METHOD OF IMPROVING USER RECOGNITION IN THE DIGITAL IMAGING PROCESSOR

(75) Inventors: Yeon-ji Choi, Daegu (KR); Hong-ju Kim, Changwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 223 days.

(21) Appl. No.: 12/911,027

(22) Filed: Oct. 25, 2010

(65) Prior Publication Data

US 2011/0115936 A1    May 19, 2011

(30) Foreign Application Priority Data

Nov. 17, 2009    (KR) .................... 10-2009-0110918

(51) Int. Cl.
*H04N 5/228*    (2006.01)
(52) U.S. Cl.
USPC .................... 348/222.1; 348/333.01; 348/372
(58) Field of Classification Search
USPC .................... 348/222.1, 333.01, 341, 372
See application file for complete search history.

(56) References Cited

U.S. PATENT DOCUMENTS

| | | | | |
|---|---|---|---|---|
| 2006/0284984 A1* | 12/2006 | Takemoto et al. | ........ | 348/208.99 |
| 2009/0051784 A1* | 2/2009 | Oda | ........................ | 348/229.1 |
| 2009/0262211 A1* | 10/2009 | Mori | ........................ | 348/222.1 |
| 2010/0039402 A1* | 2/2010 | Okazaki | .................. | 348/333.01 |

FOREIGN PATENT DOCUMENTS

JP    07-303202 A    11/1995

* cited by examiner

*Primary Examiner* — Gevell Selby
(74) *Attorney, Agent, or Firm* — Drinker Biddle & Reath LLP (57) ABSTRACT

A digital image processor and method of improving user recognition in the digital image processor are provided. The digital image processor includes a view finder for a user to view a subject and a display unit on which an image is electrically realized, the digital image processor includes: a sensing unit for sensing rotation of the digital image processor; a detecting unit disposed at one side of the view finder and comprising an emission unit for emitting light and a light receiving unit for receiving light reflected by the user; and a control unit for increasing time for emitting light from the emission unit when the rotation is sensed by the sensing unit and controlling power supply to the display unit based on an output value corresponding to an amount of incident light onto the light receiving unit.

13 Claims, 10 Drawing Sheets

| OUT TIME | PULSE NUMBER | DUTY | 1 | 2 | 3 | 4 | 5 | 6 |
|---|---|---|---|---|---|---|---|---|
| 3.0m | 30 | 20 | 7.0 | 5.6 | 4.4 | 3.0 | 2.2 | 1.2 |
| 3.1m | 31 | 20 | 7.0 | 5.6 | 4.4 | 3.2 | 2.3 | 1.2 |
| 3.2m | 32 | 20 | 7.3 | 5.7 | 4.5 | 3.3 | 2.3 | 1.3 |
| 3.3m | 33 | 20 | 7.3 | 5.8 | 4.6 | 3.3 | 2.3 | 1.3 |
| 3.4m | 34 | 20 | 7.3 | 5.8 | 4.6 | 3.3 | 2.4 | 1.3 |
| 3.5m | 35 | 20 | 7.4 | 5.9 | 4.7 | 3.4 | 2.5 | 1.4 |
| 3.6m | 36 | 20 | 7.4 | 5.9 | 4.7 | 3.4 | 2.5 | 1.4 |
| 3.7m | 37 | 20 | 7.4 | 5.9 | 4.7 | 3.4 | 2.5 | 1.4 |
| 3.8m | 38 | 20 | 7.5 | 6.0 | 4.7 | 3.5 | 2.5 | 1.5 |
| 3.9m | 39 | 20 | 7.5 | 6.0 | 4.7 | 3.5 | 2.5 | 1.6 |
| 4.0m | 40 | 20 | 7.6 | 6.1 | 4.9 | 3.6 | 2.5 | 1.6 |
| 4.1m | 41 | 20 | 7.6 | 6.2 | 4.9 | 3.6 | 2.5 | 1.6 |
| 4.1m | 42 | 20 | 7.7 | 6.3 | 4.9 | 3.6 | 2.6 | 1.6 |
| 4.3m | 43 | 20 | 7.8 | 6.3 | 5.0 | 3.7 | 2.6 | 1.6 |
| 4.4m | 44 | 20 | 7.9 | 6.5 | 5.0 | 3.7 | 2.6 | 1.6 |
| 4.4m | 45 | 20 | 8.0 | 6.5 | 5.2 | 3.9 | 2.8 | 1.7 |
| 4.6m | 46 | 20 | 8.2 | 6.6 | 5.2 | 4.0 | 2.8 | 1.7 |
| 4.7m | 47 | 20 | 8.3 | 6.6 | 5.2 | 4.0 | 2.8 | 1.8 |
| 4.7m | 48 | 20 | 8.4 | 6.6 | 5.3 | 4.0 | 2.9 | 1.8 |
| 4.7m | 49 | 20 | 8.5 | 6.9 | 5.4 | 4.0 | 2.9 | 1.8 |
| 4.7m | 50 | 20 | 8.6 | 6.9 | 5.5 | 4.1 | 2.9 | 1.9 |

FIG. 11

| PULSE NUMBER | DUTY | 1 | 2 | 3 | 4 | 5 | 6 |
|---|---|---|---|---|---|---|---|
| | | RECOGNITION DISTANCE ACCORIDNG TO BRIGHTNESS OF SUBJECT (Cm) | | | | | |
| 40 | 20 | 7.6 | 6.1 | 4.9 | 3.6 | 2.5 | 1.6 |
| 40 | 21 | 8.1 | 6.6 | 5.2 | 3.9 | 2.7 | 1.5 |
| 41 | 20 | 7.6 | 6.2 | 4.9 | 3.6 | 2.5 | 1.6 |
| 41 | 21 | 8.3 | 6.7 | 5.2 | 4.0 | 2.8 | 1.5 |
| 42 | 20 | 7.8 | 6.3 | 4.9 | 3.6 | 2.5 | 1.6 |
| 42 | 21 | 8.3 | 6.8 | 5.4 | 4.1 | 2.8 | 1.6 |
| 43 | 20 | 7.8 | 6.3 | 5.0 | 3.7 | 2.6 | 1.6 |
| 43 | 21 | 8.6 | 6.8 | 5.4 | 4.1 | 2.8 | 1.6 |
| 44 | 20 | 7.9 | 6.5 | 5.1 | 3.9 | 2.8 | 1.7 |
| 44 | 21 | 8.6 | 6.9 | 5.5 | 4.1 | 2.9 | 1.6 |
| 45 | 20 | 8.0 | 6.5 | 5.2 | 3.9 | 2.8 | 1.7 |
| 45 | 21 | 8.7 | 7.1 | 5.5 | 4.1 | 2.9 | 1.6 |
| 46 | 20 | 8.2 | 6.6 | 5.2 | 4.0 | 2.8 | 1.7 |
| 46 | 21 | 8.8 | 7.3 | 5.6 | 4.3 | 3.0 | 1.8 |
| 47 | 20 | 8.3 | 6.6 | 5.2 | 4.0 | 2.8 | 1.8 |
| 47 | 21 | 8.8 | 7.3 | 5.6 | 4.3 | 3.1 | 1.9 |
| 48 | 20 | 8.4 | 6.8 | 5.3 | 4.0 | 2.9 | 1.8 |
| 48 | 21 | 8.9 | 7.5 | 5.6 | 4.4 | 3.1 | 2.0 |
| 49 | 20 | 8.5 | 6.9 | 5.4 | 4.1 | 2.9 | 1.8 |
| 49 | 21 | 9.0 | 7.6 | 5.7 | 4.4 | 3.2 | 2.1 |
| 50 | 20 | 8.6 | 6.9 | 5.5 | 4.1 | 2.9 | 1.8 |
| 50 | 21 | 9.1 | 7.7 | 5.8 | 4.4 | 3.2 | 2.1 |

DIGITAL IMAGING PROCESSOR AND METHOD OF IMPROVING USER RECOGNITION IN THE DIGITAL IMAGING PROCESSOR

CROSS-REFERENCE TO RELATED PATENT APPLICATION

This application claims the benefit of Korean Patent Application No. 10-2009-0110918, filed on Nov. 17, 2009, in the Korean Intellectual Property Office, the disclosure of which is incorporated herein in its entirety by reference.

BACKGROUND

The invention relates to a digital image processor and a method of improving user recognition in the digital image processor, and more particularly, to a method of improving user recognition by an eye sensor used in a digital image processor.

Digital single lens reflex (DSLR) cameras, which may take a photograph in a profession level, have been widely distributed. Here, the DSLR denotes a form in which an object is sent to a view finder through one lens or light is sent to a sensor that takes a photograph.

In such a general DSLR camera, a mirror on an optical axis of a lens is formed to rotate within a predetermined angle based on an axis. Normally, light of a subject obtained from a lens unit is reflected from a mirror and an image is formed on a focusing plate so that a user may identify an image of a subject formed on the focusing plate by using a pentaprism and a view finder.

Here, when a shutter-release signal is input, the mirror rotates within the predetermined range based on the axis and rises to keep away from the optical axis of the lens unit. When a shutter is in an open state due to a control of a shutter driving circuit, an image of a subject is formed on an imaging device.

While a user identifies a subject through a view finder, when a display unit is turned on, unnecessary power is consumed. Thus, an eye sensor is applied around a view finder of a general DSLR. When a user is sensed within a predetermined distance from finder, the display unit is automatically turned off and thus unnecessary power is prevented from being consumed.

SUMMARY

Various embodiments of the invention provide a digital image processor having enhanced user recognition by an eye sensor.

According to an embodiment of the invention, there is provided a digital image processor comprising a view finder for a user to view a subject and a display unit on which an image is electrically realized, the digital image processor including: a sensing unit for sensing rotation of the digital image processor; a detecting unit disposed at one side of the view finder and comprising an emission unit for emitting light and a light receiving unit for receiving light reflected by the user; and a control unit for increasing time for emitting light from the emission unit when the rotation is sensed by the sensing unit and controlling power supply to the display unit based on an output value corresponding to an amount of incident light onto the light receiving unit.

The sensing unit may be a rotation sensor.

The control unit may increase the time for emitting light from the emission unit by increasing pulse numbers of the emission unit or duty ratio of pulse of the emission unit, or shortening frequency of pulse of the emission unit.

A maximum recognition distance of the detecting unit may be controlled based on the output value corresponding to an amount of incident light onto the light receiving unit.

According to another embodiment of the invention, there is provided a digital image processor including a view finder for a user to view a subject and a display unit on which an image is electrically realized, the digital image processor including: a sensing unit for sensing rotation of the digital image processor; a detecting unit disposed at one side of the view finder and comprising an emission unit for emitting light and a light receiving unit for receiving light reflected by the subject; and a control unit for controlling time for emitting light from the emission unit and controlling power supply to the display unit based on an output value output from the detecting unit.

The control unit may increase the time for emitting light from the emission unit when rotation is sensed by the sensing unit.

The control unit may decrease an amount of light emitted from the emission unit when light reflectivity of the user is higher than reference reflectivity, and increase an amount of light emitted from the emission unit when light reflectivity of the user is lower than reference reflectivity.

The control unit may increase the time for emitting light from the emission unit by increasing pulse numbers of the emission unit or duty ratio of pulse of the emission unit, or shortening frequency of pulse of the emission unit.

According to another embodiment of the invention, there is provided a method of enhancing user recognition in a digital image processor, wherein the digital image processor includes a detecting unit comprising an emission unit for emitting light disposed at one side of a view finder and a light receiving unit for receiving light reflected by a user, the method including: sensing rotation of the digital image processor; increasing time for emitting light from the emission unit when the rotation is sensed by the sensing unit; and controlling power supply to a display unit based on an output value corresponding to an amount of incident light onto the light receiving unit.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Hereinafter, one or more embodiments of the invention will be described more fully with reference to the accompanying drawings.

Figure 1:
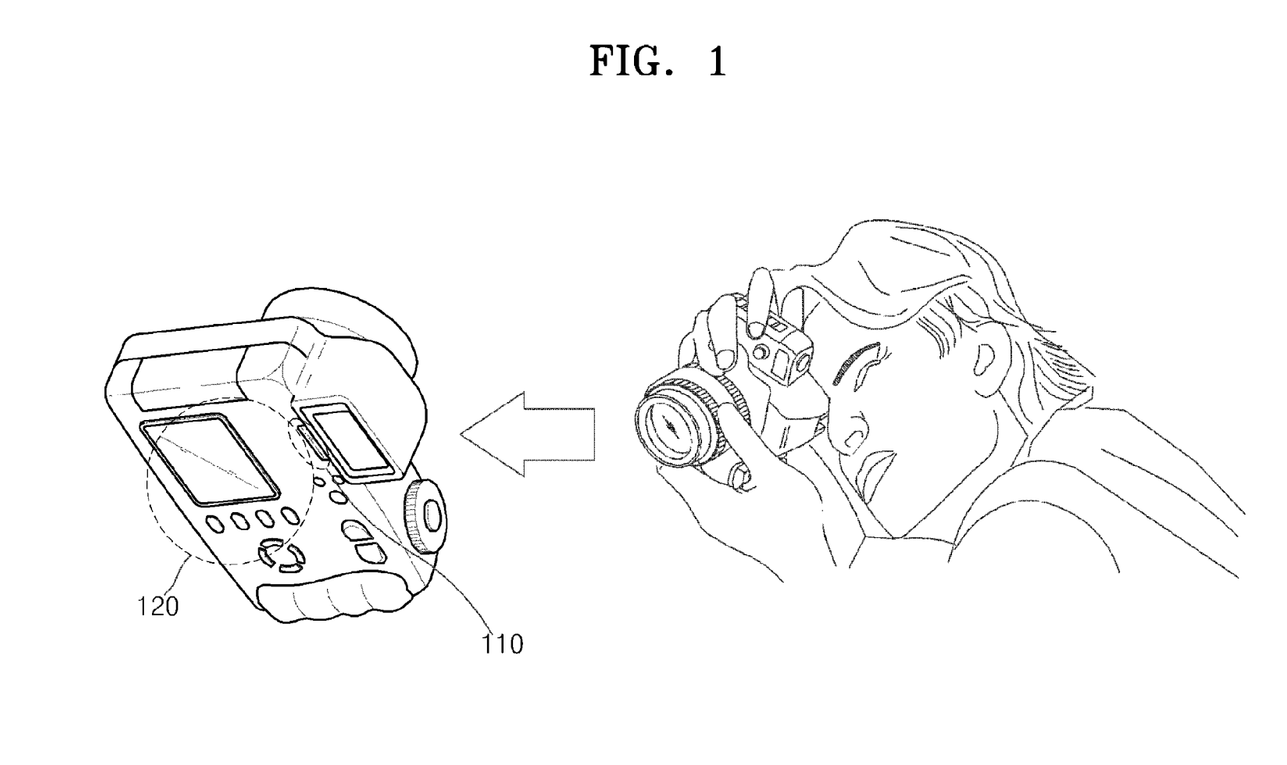
FIG. 1 is a pictorial view illustrating the use of a digital image processor to which an eye sensor is installed.

FIG. 1 is a view illustrating the use of a digital image processor to which an eye sensor is installed.

Referring to FIG. 1, a user takes a photograph while turning a camera, as the digital image processor, in a vertical direction.

When the user takes a photograph by turning the camera in a vertical direction, an eye sensor 110 and an end part of a user face 120 are parallel to each other. As a result, a contact area of the eye sensor 110 and the user face 120 decreases so that the eye sensor 110 may not recognize the user.

Figure 2:
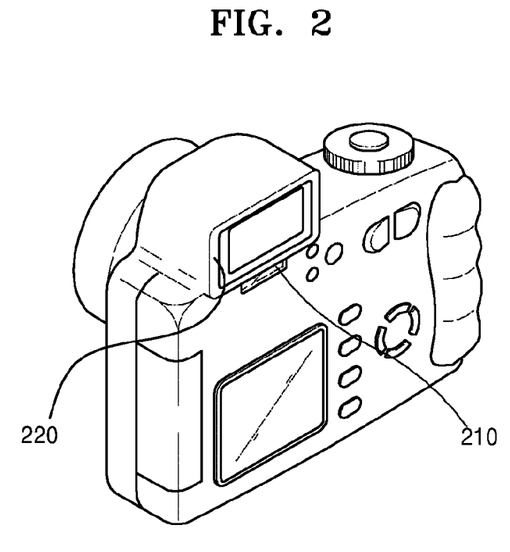
FIG. 2 is a perspective view illustrating a mechanical characteristic of a digital image processor to which an eye sensor is installed.

FIG. 2 is a view illustrating a mechanical characteristic of a digital image processor to which an eye sensor 210 is installed. Referring to FIG. 2, a view finder 220, by which a user checks a subject, is slightly projected, whereas an eye sensor 210 is sunken into a direction where a display is installed, compared with the view finder 220.

According to an embodiment of the invention, the digital image processor is manufactured to accommodate a three-dimensional effect of a user face based on the fact that the user uses the camera in a horizontal direction. That is, the view finder 220 where an eye of the user touches is projected and the eye sensor 210 is embedded relatively deeply onto the rear of the digital image processor.

As illustrated in FIG. 1, when the user takes a photograph by turning the camera in a vertical direction, the eye sensor 210 may not recognize the user. Hereinafter, solutions for the problems are provided.

Figure 3:
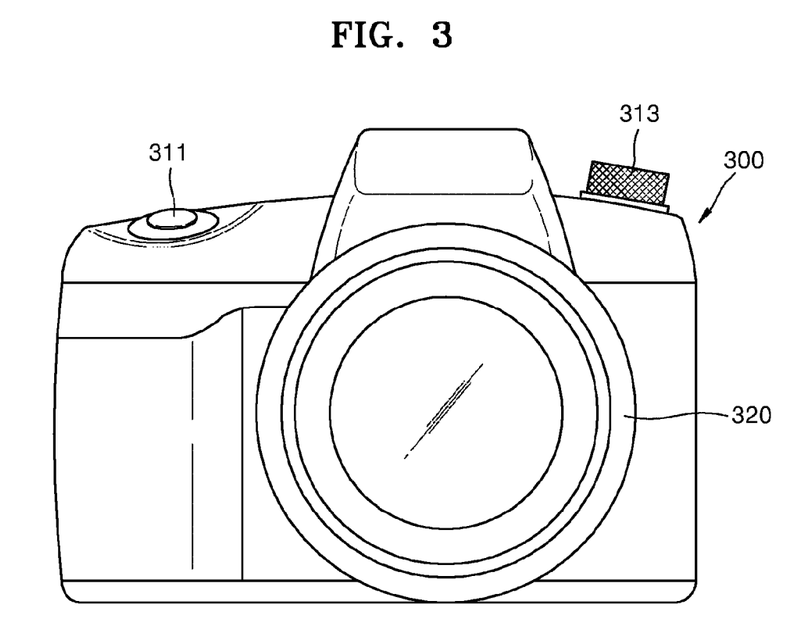
FIG. 3 is a front view of a digital image processor according to an embodiment of the invention.
Figure 4:
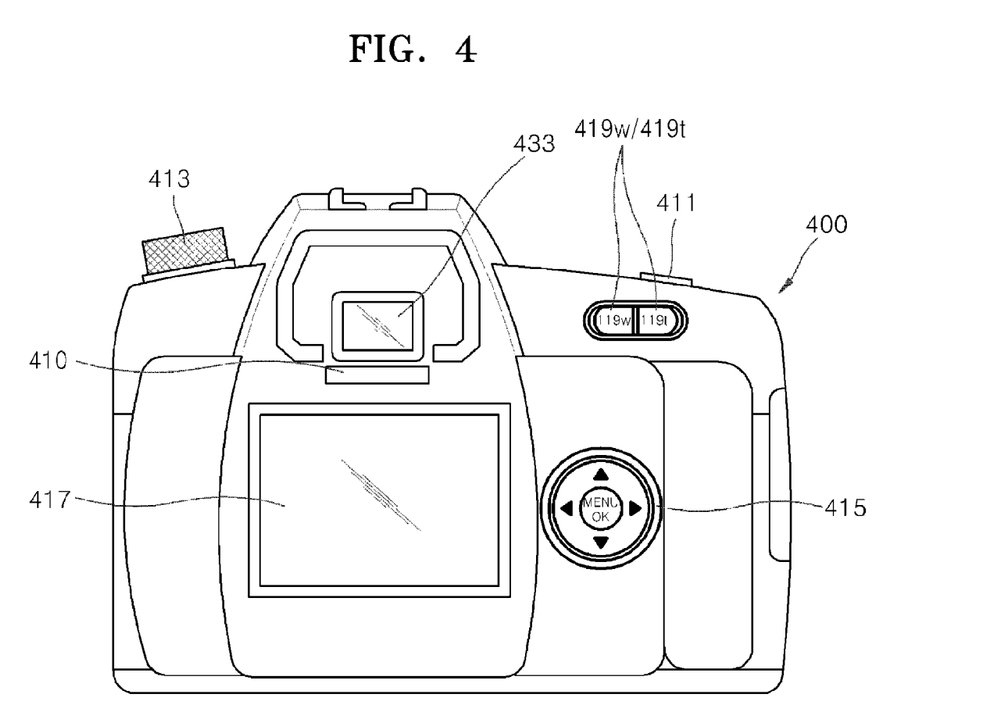
FIG. 4 is a rear view of a digital image processor according to and embodiment of the invention.
Figure 5:
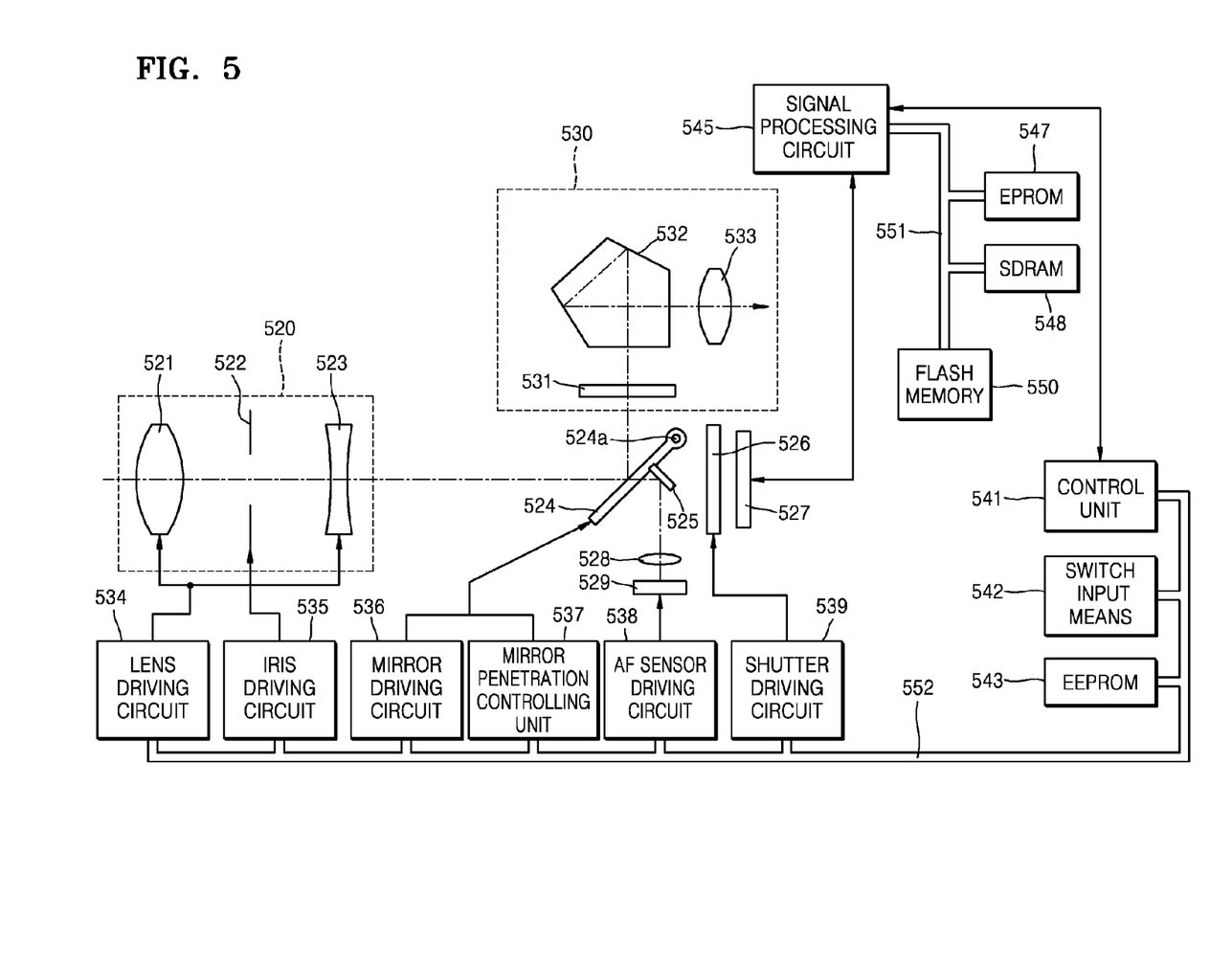
FIG. 5 is a block diagram of a digital image processor according to an embodiment of the invention.

FIGS. 3 through 5 illustrate an external form and an internal block diagram of a digital image processor to which an eye sensor is installed. Throughout the specification, the eye sensor is used as an example of a detecting unit.

FIG. 3 is a front view of a digital image processor 300 according to an embodiment of the invention. Referring to FIG. 3, a shutter-release button 311, a mode dial 313, and a lens unit 320 are disposed on the front of the digital image processor 300.

The shutter-release button 311 of the digital image processor 300 is opened and closed to expose an image obtaining device (for example, a charge-coupled device or a complementary metal oxide semiconductor) to light for a predetermined time and is connected to an iris (not illustrated) to appropriately expose a subject, thereby recording an image to the image obtaining device.

The shutter-release button 311 generates first and second image photographing signals by user's input. When the first image photographing signal is input as a half-shutter signal, the digital image processor 300 is focused and adjusts an amount of light. When the digital image processor 300 is focused and an amount of light is adjusted due to an input of the first image photographing signal, the second image photographing signal is input as a full-shutter signal and an image is photographed.

The mode dial 313 is used to select a photographing mode. In the digital image processor 300, the mode dial 313 supports, but is not limited to, an AUTO (automatic photographing) mode, a SCENE mode, an EFFECT mode, and an A/S/M mode, wherein the AUTO (automatic photographing) mode is used to simplify user setting and to take a photograph rapidly and conveniently according to the purpose of use, the SCENE mode is used to simply set the optimum camera according to a photographing state or a subject state, the EFFECT mode is used to provide special effect to image photographing such as continuous photographing or scene photographing, and the A/S/M mode is used to manually set various functions such as an iris and shutter speed and to photograph an image. The lens unit 320 receives light from external optical source and processes an image.

FIG. 4 is a rear view of a digital image processor 400 according to an embodiment of the invention. Referring to FIG. 4, a view finder 433, an eye sensor 410, a wide angle-zoom button 419w, a telephoto-zoom button 419t, a function button 415, and a display unit 417 are disposed at the rear of the digital image processor 400.

In the digital image processor 400, the view finder 433 is a small window for viewing a subject to be photographed and setting the composition. The detecting unit 410 senses the user within a predetermined distance from the view finder 433. When the user is sensed by the detecting unit 410, the display unit 417 is automatically turned off and thus electric power is prevented from being unnecessarily consumed. Examples of the detecting unit 410 may include eye sensors or proximity sensors. An operation of the detecting unit 410 will be described later with reference to FIG. 6.

In the wide angle-zoom button 419w or the telephoto-zoom button 419t, a viewing angle is widen or narrowed according to an input. In particular, when a size of a selected exposed area is to be changed, the wide angle-zoom button 419w or the telephoto-zoom button 419t may be input. When the wide angle-zoom button 419w is input, the size of the selected exposed area decreases. When the telephoto-zoom button 419t is input, the size of the selected exposed area increases.

The function button 415 includes five buttons such as an upward button, a downward button, a left button, a right button, and a menu/OK button. The function button 415 is input to execute various menus for an operation of the digital image processor 400 and the function button 415 may vary according to manufacturers.

Although not illustrated in FIG. 4, the digital image processor according to an embodiment of the invention may further include a detecting unit including an emission unit and a light receiving unit. The detecting unit will be described later with reference to FIG. 6.

FIG. 5 is a block diagram of a digital image processor 500 according to an embodiment of the invention.

Referring to FIG. 5, the digital image processor 500 includes a control unit 541 and a plurality of elements (for example, a lens unit 520, a shutter 526, an imaging device 527, and a finder optical system 530), wherein the control unit 541 controls the entire operation of the camera and the plurality of elements are operated according to a control signal from the control unit 541.

The lens unit 520 includes a first lens 521, a second lens 523, and an iris 522 interposed between the first lens 521 and the second lens 523. The first lens 521 and the second lens 523 included in the lens unit 520 are controlled by a lens driving circuit 534 and the iris 522 is controlled by an iris driving circuit 535.

On the optical axis of the first lens 521 and the second lens 523, a mirror 524, in which the center thereof is formed of a half mirror, is disposed at the rear of the second lens 523. The mirror 524 is formed to rotate within a predetermined angle based on an axis 524a.

A sub-mirror 525 is formed at the rear surface of the mirror 524. A part of incident light onto the lens unit 520 penetrates the mirror 524 and is reflected by the sub-mirror 525. A separator optical system 528 for 2-phases separation is disposed on a reflected light axis of the sub-mirror 525. An AF sensor 529 is disposed on a position where an image of the subject is formed by the separator optical system 528. The AF sensor 529 is connected to an AF sensor driving circuit 538.

The sub-mirror 525, the separator optical system 528, and the AF sensor 529 constitute a focus detection device by a well-known phase contrast method. The AF sensor 529 is controlled by the AF sensor driving circuit 538 under the control of the control unit 541. That is, the control unit 541 calculates a defocused amount based on an image signal generated by the AF sensor 529, controls the lens driving circuit 534 by using the calculated defocused amount, focuses by driving the first lens 521 and the second lens 523 included in the lens unit 520. Here, the lens driving circuit 534 includes a driving source for an electronic motor or an ultrasonic motor, a driver circuit for controlling the electronic motor or the ultrasonic motor, and an encoder device for detecting the location of a lens.

The finder optical system 530 including a focusing plate 531, a pentaprism 532, and a view finder 533 is disposed on a path of light reflected from the mirror 524. Light of the subject obtained from the first lens 521 and the second lens 523 included in the lens unit 520 is reflected from the mirror 524 and an image is formed on the focusing plate 531.

A user may identify an image of the subject formed on the focusing plate 531 by using the pentaprism 532 and the view finder 533. A detecting unit (not illustrated) may sense the user within a predetermined distance from the view finder 533. When the user is sensed through the detecting unit (not illustrated), the display unit is automatically turned off.

The mirror 524 and the sub-mirror 525 are formed to be rotated within a predetermined range based on the axis 524a of the mirror 524 by a mirror driving circuit 536 and thus may be driven by keeping away from the optical axis of the first lens 521 and the second lens 523 included in the lens unit 520. Also, the shutter 526 and the imaging device 527 are disposed at the rear of the mirror 524 on the optical axis of the lens unit 520.

The shutter 526 is opened for a predetermined time due to the control of the shutter driving circuit 539 and an image of the subject is photographed by the imaging device 527. That is, the mirror 524 rises to keep away from the optical axis of the lens unit 520 due to the control of the mirror driving circuit 536. When the shutter 526 is opened by the control of the shutter driving circuit 539, an image of the subject is formed on the imaging device 527.

The lens driving circuit 534, the iris driving circuit 535, mirror driving circuit 536, the AF sensor driving circuit 538, and the shutter driving circuit 539 are connected to the control unit 541 formed of a microprocessor through a data bus 552.

A switch input 542 and an electrically erasable programmable read-only memory (EEPROM) 543, which is a non-volatile memory, are also connected to the control unit 541 formed of a microprocessor through a data bus 552.

The switch input 542 includes a first release switch, a second release switch, and a plurality of switches, wherein the first release switch is turned on by the first image photographing signal as a half-shutter signal of the shutter-release button 311 of FIG. 5, the second release switch is turned on by the second image photographing signal as a full-shutter signal of the shutter-release button 311 of FIG. 5, and the plurality of switches such as a power switch is connected to a power button (not illustrated), and provides a manipulation signal by any one of switches of the switch input 542 to the control unit 541.

When the first release switch is turned on, the control unit 541 controls the AF sensor driving circuit 538 to calculate a distance between 2-phases on the AF sensor 529 and controls the lens driving circuit 534 from distance data to adjust focus of the first lens 521 and the second lens 523 included in the lens unit 520.

When the second release switch is turned on, the control unit 541 controls the mirror driving circuit 536 to drive the mirror 524 by keeping away from the optical axis and obtains an appropriate area contraction value and a shutter exposed time based on subject brightness information which is based on the output of the AF sensor 529. Also, the iris 522 is driven by controlling the iris driving circuit 535 by using the area contraction value and the shutter 526 is driven by controlling the shutter driving circuit 539 by using the shutter exposed time.

Accordingly, when an image of the subject is formed on an imaging surface of the imaging device 527, the image of the subject is converted into an analog image signal and the analog image signal is converted into a digital image signal in a signal processing circuit 545. The signal processing circuit 545 is connected to an erasable programmable read-only memory (EPROM) 547, a synchronous dynamic random access memory (SDRAM) 548, and a flash memory 550 by using a data bus 551.

The EPROM 547 includes programs executed in a processor included in the signal processing circuit 545. The SDRAM 548 is a memory which temporarily memorizes image data before image processing or during image processing.

The flash memory 550 is a non-volatile memory which memorizes image data that is finally confirmed. The SDRAM 548 is a volatile and temporarily memorizing memory and may be driven at high speed. However, memory is erased in the SDRAM 548 when the power supply is unavailable. On the other hand, the flash memory 550 is a non-volatile memory and is driven at low speed. However, memory is maintained even if the power supply is unavailable.

Figure 6:
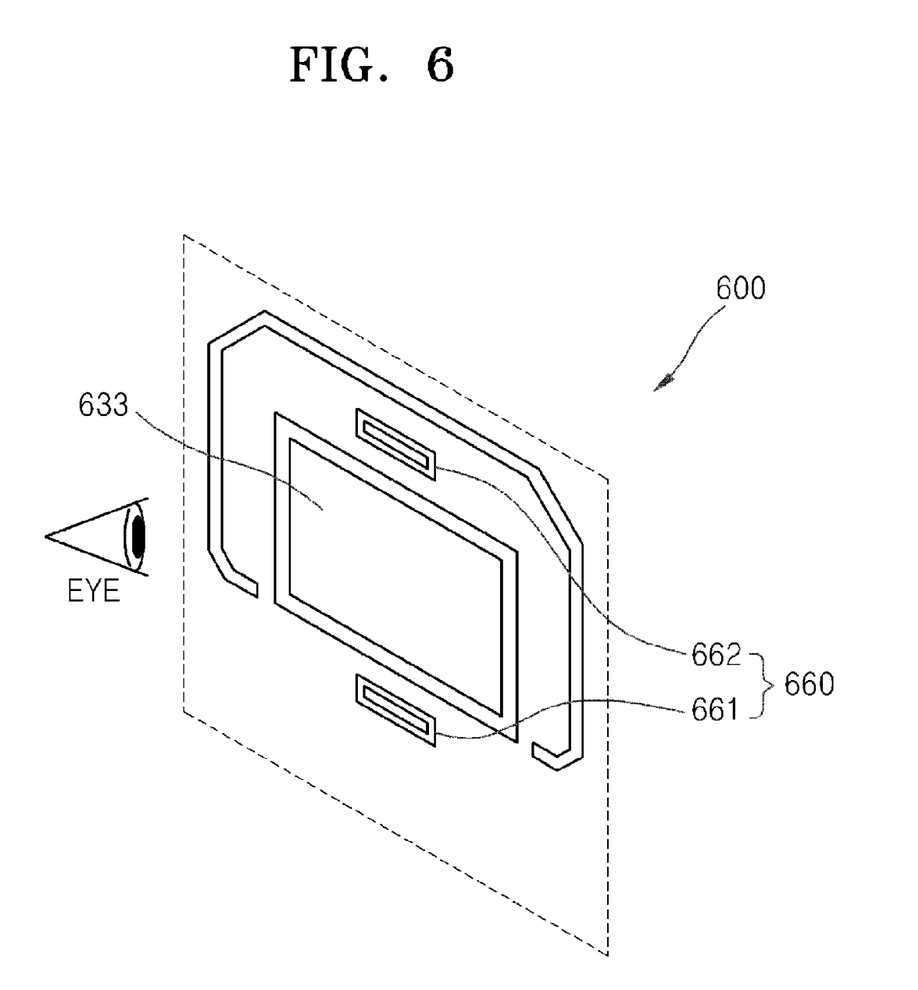
FIG. 6 is a view of a detecting unit of a digital image processor according to an embodiment of the invention.

FIG. 6 is a view of a detecting unit 660 of a digital image processor 600 according to an embodiment of the invention.

Referring to FIG. 6, the detecting unit 660 of the digital image processor 600 includes an emission unit 661 and a light receiving unit 662. In the digital image processor 600, when light such as visible light and infrared light is emitted from the emission unit 661, light reflecting from or penetrating a subject is detected from the light receiving unit 662, thereby obtaining an output signal.

More specifically, when a user is spaced apart from a view finder 633 by a predetermined distance above some specified value, no object exists around the view finder 633 so that light reflected from the emission unit 661 is not incident onto the light receiving unit 662.

However, when an eye of the user is closed to the view finder 633 through the view finder 633 in order to view a subject, light reflected from the emission unit 661 is reflected by the subject and is incident onto the light receiving unit 662.

Figure 7:
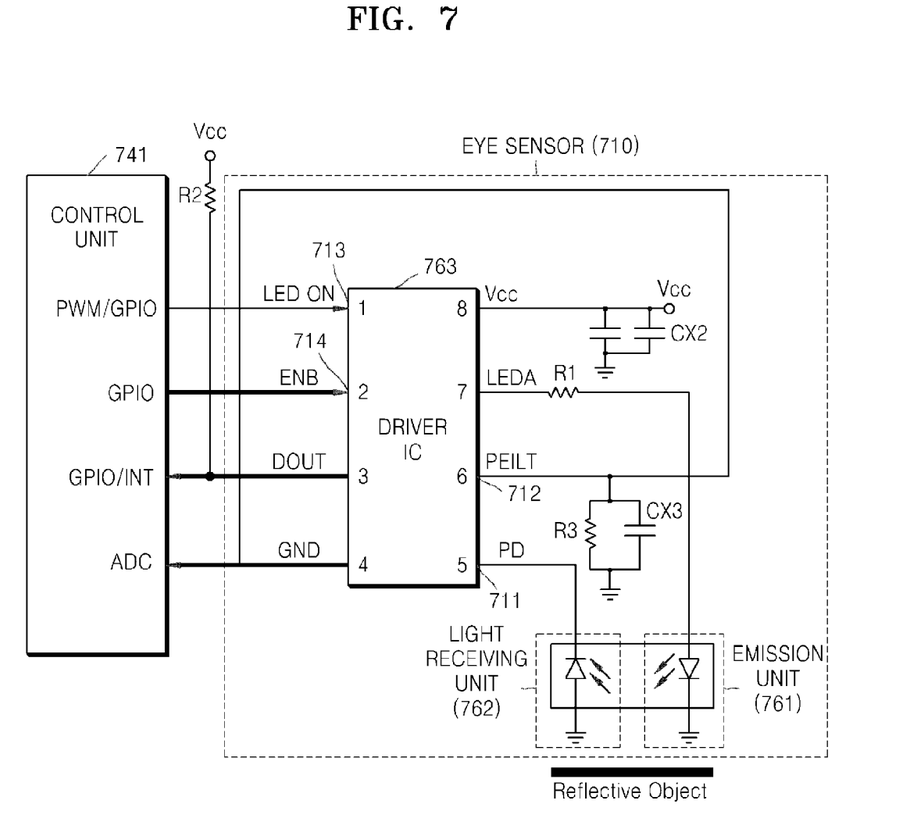
FIG. 7 is an internal circuit diagram of a detecting unit of a digital image processor according to an embodiment of the invention.

The light receiving unit 662 outputs a light receiving signal, which corresponds to an amount of incident light, as an output value to a control unit 741 of FIG. 7. The control unit 741 of FIG. 7 adjusts a maximum recognition distance of the detecting unit 660 based on the output value output from the light receiving unit 662. In this case, the detecting unit 660 is driven only when an analog output threshold voltage value output from the light receiving unit 662 is above a threshold voltage.

When the detecting unit 660 responds, the view finder 633 is turned on and thus the control unit blocks the power of a liquid crystal display (LCD). Thus, power is prevented from being unnecessarily consumed.

In FIG. 6, the emission unit 661 is disposed below the view finder 633. However, the invention is not limited thereto and the locations of the emission unit 661 and the light receiving unit 662 may vary as light emitted from the emission unit 661 is reflected by the user and is incident onto the light receiving unit 662.

FIG. 7 is an internal circuit diagram of a detecting unit of a digital image processor according to an embodiment of the invention. More specifically, FIG. 7 illustrates an internal circuit diagram of an eye sensor 710, which is an example of the detecting unit.

A light receiving unit 762 detects light emitted from an emission unit 761 and is reflected by a user. The light receiving unit 762 outputs an output value 712 of the eye sensor 710 generated based on the detected light to the control unit 741. The control unit 741 automatically adjusts a maximum recognition distance for recognizing or detecting object according to the output value 712 of the light receiving unit 762.

The eye sensor 710 includes the emission unit 761, the light receiving unit 762, and a driver integrated circuit (IC) chip 763. Various types of optical sources such as light-emitting diode may be used as the emission unit 761. Also, various types of light receiving devices such as photo diode may be used as the light receiving unit 762.

The control unit 741 is connected to the driver IC chip 763 by a signal 713, which controls an infrared light LED, and an ENB signal 714, which enables the driver IC chip 763.

If the user is spaced apart from a view finder by a predetermined distance or above, an object does not exist around the view finder so that light emitted from the emission unit 761 is not incident onto the light receiving unit 762.

However, when an eye of the user is closed to the view finder through the view finder in order to view a subject, light emitted from the emission unit 761 is reflected by the user and is incident onto the light receiving unit 762.

The light receiving unit 762 outputs a light receiving signal, which corresponds to an amount of incident light, as an output value to the control unit 741. That is, the output value 712 (an analog output value of PFILT) of the eye sensor 710 may vary according to reflectivity of the user.

In general, people having dark skin have low reflectivity and people having light skin have high reflectivity. A difference in reflectivity between a white woman having high reflectivity and a black woman having low reflectivity is almost double.

For example, since black people have low reflectivity, a recognition distance is shortened so that even if the user closes within a predetermined distance from a view finder, the display unit is not turned off and instead is continuously turned on and thus unnecessary power is consumed.

Alternatively, since white people have high reflectivity, a recognition distance is extended so that even if the user is not close to the view finder above a standard distance, the user may be recognized and thus the display unit may be turned off.

In addition, when the user uses a digital photographing apparatus in a vertical direction, an amount of incident light onto the light receiving unit 762 may be reduced and thus an eye sensor may not be operated.

Hereinafter, a method of controlling the difference in reflectivity of the user and enhancing the user recognition by an eye sensor when the user uses a digital photographing apparatus by rotating the apparatus is described.

Figure 8:
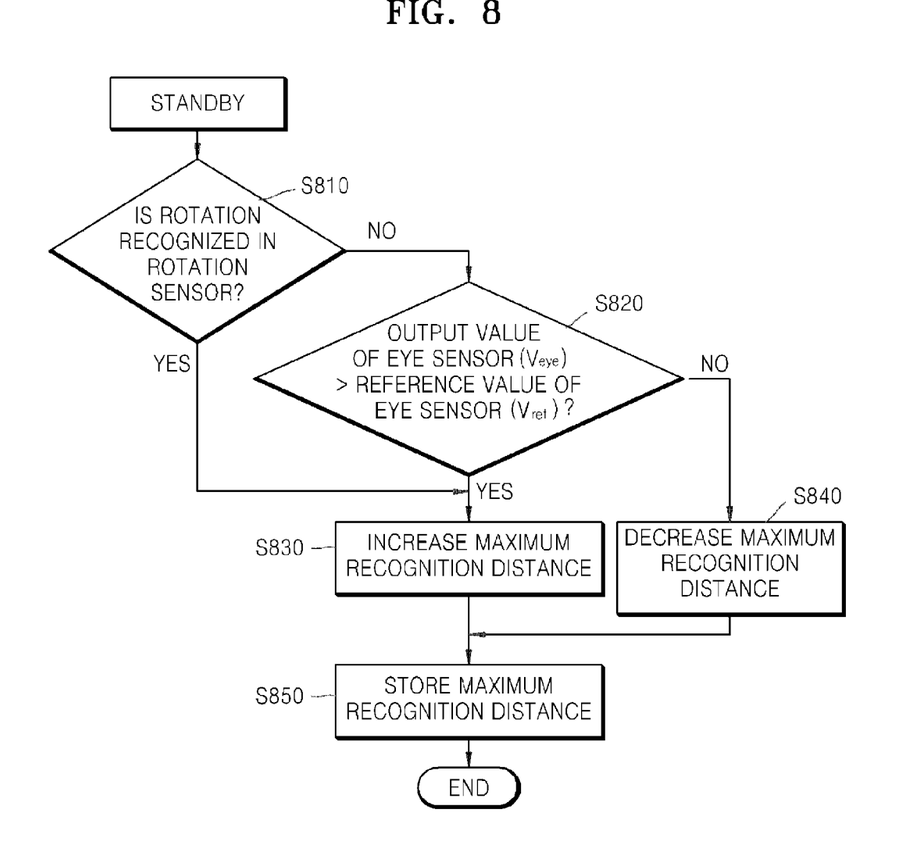
FIG. 8 is a flowchart illustrating a method of enhancing user recognition by an eye sensor when a digital image processor to which the eye sensor is installed is used according to an embodiment of the invention.

FIG. 8 is a flowchart illustrating a method of enhancing user recognition by an eye sensor when a digital image processor to which the eye sensor is installed is used according to an embodiment of the invention.

Referring to FIG. 8, the method of enhancing user recognition in the digital image processor includes recognizing rotation from a rotation sensor, in operation S810, comparing an output value $V_{eye}$ of a detecting unit and a preset reference value $V_{ref}$ in operation S820, increasing a maximum recognition distance of the digital image processor if the output value $V_{eye}$ of the detecting unit is greater than the preset reference value $V_{ref}$ as a result of the comparison, in operation S830, decreasing a maximum recognition distance of the digital image processor if the output value $V_{eye}$ of the detecting unit is less than the preset reference value $V_{ref}$ as a result of the comparison, in operation S840, and storing the increased or decreased maximum recognition distance, in operation 850.

The method of enhancing user recognition in the digital image processor is described more fully as follows.

In operation S810, whether rotation of the digital image processor is recognized in the rotation sensor is identified. As an example of the case when the rotation is recognized in the rotation sensor, the user may use the digital image processor in a vertical direction as illustrated in FIG. 1. It is assumed that the rotation sensor (not illustrated) is installed in the digital image processor.

When the rotation is recognized in the rotation sensor, the maximum recognition distance of the detecting unit increases, in operation S830. Then the increased maximum recognition distance is stored, in operation S850.

In operation S830, in order to increase the maximum recognition distance of the detecting unit, the time for emitting light from an emission unit increases. That is, as the time for emitting light from the emission unit increases, an amount of light reflected by the user is consequently increases and thus the maximum recognition distance of the detecting unit increases.

In order to increase the time for emitting light from the emission unit, the control unit 741 of FIG. 7 may increase pulse numbers of the emission unit or duty ratio of pulses, or control frequency of pulse to be short.

More specifically, when use of the camera in a vertical direction is recognized by using the rotation sensor, the pulse numbers of the emission unit increases by 4 and thus the maximum recognition distance of the eye sensor may increase.

When the rotation is not recognized by using the rotation sensor, the output value $V_{eye}$ of the eye sensor and the reference value $V_{ref}$ are compared, in operation S820.

If the output value $V_{eye}$ of the eye sensor is greater than the reference value $V_{ref}$, the maximum recognition distance increases, in operation S830. If the output value $V_{eye}$ of the eye sensor is not greater than the reference value $V_{ref}$, the maximum recognition distance decreases, in operation S840. Then, the increased or decreased maximum recognition distance is stored, in operation S850.

Operation S820 is described more fully below. A default value of the maximum recognition distance of the detecting unit is set in the digital image processor based on the user having reference reflectivity.

For example, it is assumed that the maximum recognition distance of the detecting unit is 5 cm and an output value of a light receiving unit, that is, the reference value $V_{ref}$, is 1.3 V, when the user having reference reflectivity is closed to a 5 cm distance from the view finder, In this case, when the user having reference reflectivity is closed to a 5 cm distance from the view finder, the control unit detects that the user is closed to the view finder and here, the output value $V_{eye}$ of the light receiving unit is 1.3 V.

If the reflectivity of the user is lower than the reference reflectivity, an amount of light reflected by the user is less than a reference amount. Thus, the output value $V_{eye}$ of the light receiving unit 662 should be greater than the reference value $V_{ref}$ 1.3 V to detect that the user is closed to the view finder 633.

That is, if the output value $V_{eye}$ of the light receiving unit 662 at the point when the user being closed to the view finder 633 is detected is greater than the reference value $V_{ref}$ 1.3 V (that is, $V_{ref} < V_{eye}$), it is determined that the reflectivity of the user is lower than the reference reflectivity. Thus, the maximum recognition distance of the detecting unit 660 needs to be increased, in operation S830.

Alternatively, if the reflectivity of the user is higher than the reference reflectivity, an amount of light reflected by the user is greater than a reference amount. Thus, even if the output value $V_{eye}$ of the light receiving unit is less than the reference value $V_{ref}$ 1.3 V, the user being close to the view finder may be detected.

That is, if the output value $V_{eye}$ of the light receiving unit at the point when the user being closed to the view finder is detected is less than the reference value $V_{ref}$ 1.3 V (that is, $V_{ref} > V_{eye}$), it is determined that the reflectivity of the user is higher than the reference reflectivity. Thus, the maximum recognition distance of the detecting unit needs to be decreased, in operation S840

FIG. 9 is a timing diagram illustrating controlling of the maximum recognition distance in the control unit 741 of FIG. 7.

Figure 9A:
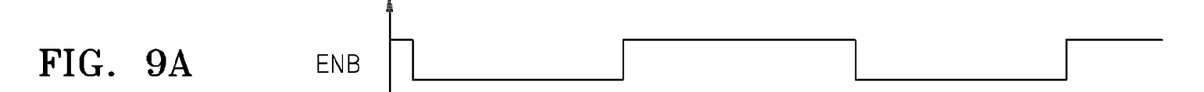
FIGS. 9A-D are timing diagrams illustrating controlling of a maximum recognition distance in a control unit of FIG. 7.
Figure 9B:
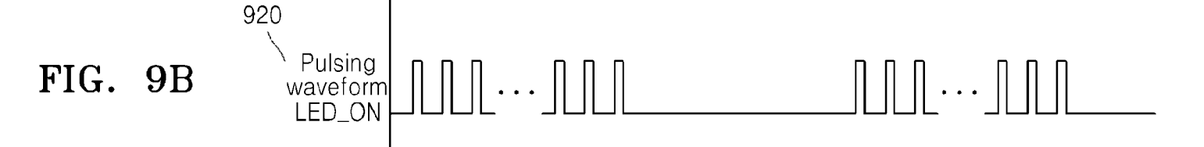
Figure 9C:
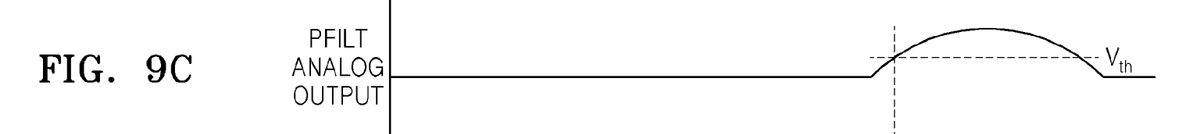
Figure 9D:
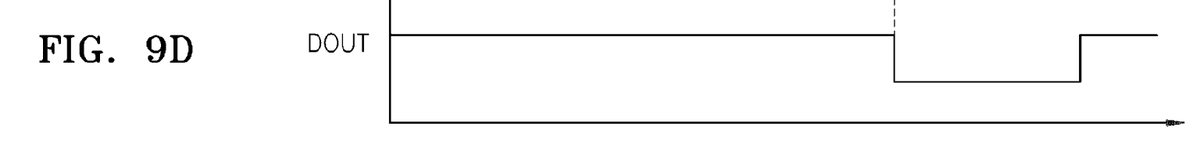

The ENB signal illustrated in FIG. 9A is a signal enabling the driver IC chip 763 of FIG. 7 of the eye sensor 710. FIG. 9B illustrates a waveform of pulse applied to the emission unit 761. FIG. 9C illustrates the PFILT analog output value 712 of FIG. 7 of the light receiving unit 762 of FIG. 7. DOUT of FIG. 9D illustrates a digital value converted from the PFILT analog output value.

In order to decrease the maximum recognition distance of the eye sensor, the time for emitting light from the emission unit decreases. That is, as the time for emitting light from the emission unit decreases, an amount of light reflected by the user is consequently decreases and thus the maximum recognition distance of the detecting unit decreases.

In this regard, in order to decrease the time for emitting light from the emission unit, the control unit may decrease pulse number pulsing waveform (PWM) of the emission unit 920 or duty ratio of pulse, or control frequency (1/T) of pulse to be long. The eye sensor is driven only when a PFILT signal exceeds the threshold value $V_{th}$.

Alternatively, in order to increase the maximum recognition distance of the eye sensor, the time for emitting light from an emission unit increases. That is, as the time for emitting light from the emission unit increases, an amount of light reflected by the user is consequently increases and thus the maximum recognition distance of the eye sensor increases.

Here, in order to increase the time for emitting light from the emission unit, the control unit may increase pulse numbers of the emission unit 920 or duty ratio of pulses, or control frequency of pulse to be short.

Figure 10:
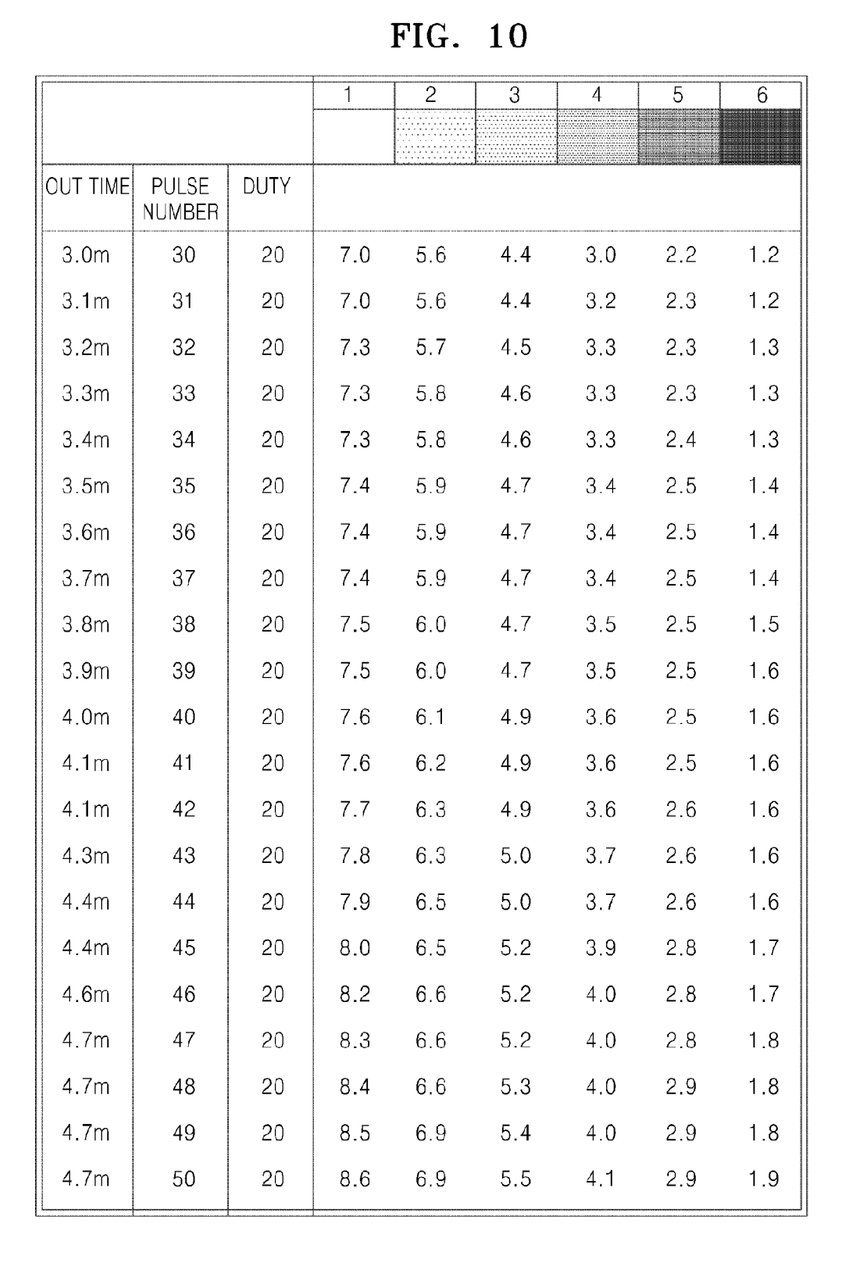
FIG. 10 is a table showing the relationship between pulse numbers of an emission unit and a maximum recognition distance of an eye sensor.

FIG. 10 is a table showing the relationship between the pulse numbers of the emission unit and the maximum recognition distance of the eye sensor. As the pulse numbers of the emission unit increase, the maximum recognition distance increases.

Figure 11:
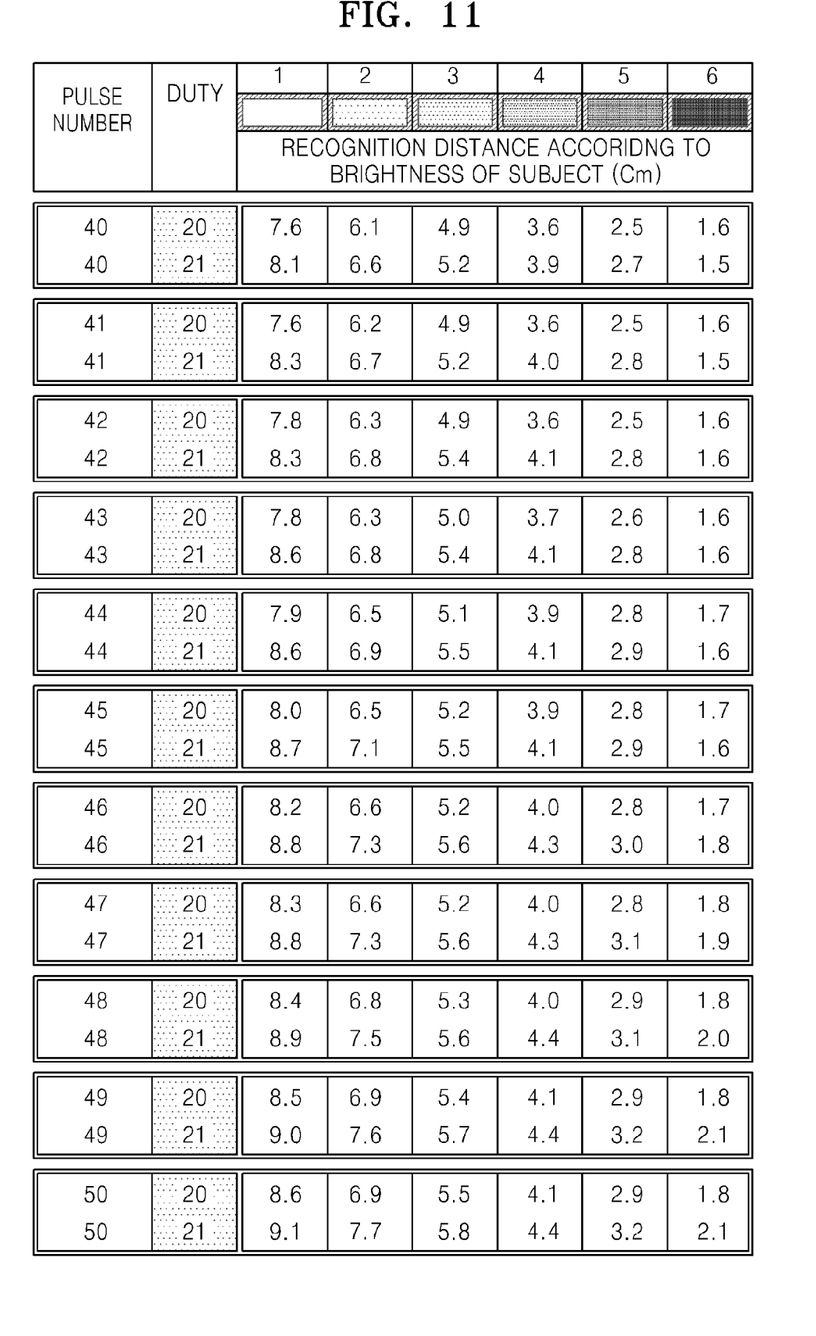
FIG. 11 is a table illustrating the relationship between duty ratio of pulses and a maximum recognition distance of an eye sensor.

FIG. 11 is a view illustrating the relationship between the duty ratio of pulses and the maximum recognition distance of the eye sensor. As the duty ratio of pulses increases, the maximum recognition distance increases.

In the digital image processor according to the embodiments of the invention, a problem that a user may not be recognized in the eye sensor of the digital image processor may be solved. The rotation sensor, which is already installed to the digital image processor, is used without additional separate hardware so that an additional cost is not generated. Also, the maximum recognition distance may be automatically controlled in the eye sensor according to a subject and thus loss of unnecessary power may be minimized.

According to the invention, if the user uses the digital image processor by rotating the digital image processor, a problem that the user may not be recognized in the eye sensor may be solved. Also, in general, as reflectivity of users varies, the maximum recognition distance of the detecting unit varies according to the users. Thus, loss of unnecessary power may be generated. However, in the digital image processor according to the embodiments of the invention, if users vary, the maximum recognition distance of the detecting unit is automatically controlled and thus loss of unnecessary power may be minimized.

The device described herein may be implemented to use any form of processor, and can include functional programs, codes, and code segments. The device may comprise, a memory for storing program data and executing it, a permanent storage, a communications port for handling communications with external devices, and user interface devices, including a display. When software modules are involved, these software modules may be stored as program instructions or computer readable codes executable on the processor on a non-transitory computer-readable media such as read-only memory (ROM), random-access memory (RAM), CD-ROMs, magnetic tapes, floppy disks, and optical data storage devices. This media is readable by the computer, stored in the memory, and executed by the processor.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components that perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

What is claimed is:

1. A digital image processor comprising a view finder for a user to view a subject and a display unit on which an image is electrically realized, the digital image processor comprising:
   a sensing unit for sensing rotation of the digital image processor;
   a detecting unit disposed at one side of the view finder and comprising an emission unit for emitting light toward the user and a light receiving unit for receiving light reflected by the user; and
   a control unit that increases time for emitting light from the emission unit when rotation is sensed by the sensing unit and controlling power supply to the display unit based on an output value corresponding to an amount of light reflected from the user onto the light receiving unit.

2. The digital image processor of claim 1, wherein the sensing unit is a rotation sensor.

3. The digital image processor of claim 1, wherein the control unit increases the time for emitting light from the emission unit by increasing pulse numbers of the emission unit or duty ratio of pulse of the emission unit, or shortening frequency of pulse of the emission unit.

4. The digital image processor of claim 1, wherein a maximum recognition distance of the detecting unit is controlled based on the output value corresponding to an amount of incident light onto the light receiving unit.

5. A digital image processor comprising a view finder for a user to view a subject and a display unit on which an image is electrically realized, the digital image processor comprising:
   a sensing unit for sensing rotation of the digital image processor;
   a detecting unit disposed at one side of the view finder and comprising an emission unit for emitting light and a light receiving unit for receiving incident light reflected by the subject; and
   a control unit that decreases an amount of light emitted from the emission unit when light reflectivity of the user is higher than reference reflectivity, and that increases an amount of light emitted from the emission unit when light reflectivity of the user is lower than reference reflectivity, and for controlling power supply to the display unit based on an output value output from the detecting unit.

6. The digital image processor of claim 5, wherein the control unit increases the time for emitting light from the emission unit when rotation is sensed by the sensing unit.

7. The digital image processor of claim 6, wherein the control unit increases the time for emitting light from the emission unit by increasing pulse numbers of the emission unit or duty ratio of pulse of the emission unit, or shortening frequency of pulse of the emission unit.

8. The digital image processor of claim 6, wherein the control unit decreases the time for emitting light from the emission unit by decreasing pulse numbers of the emission unit or duty ratio of pulse of the emission unit, or extending frequency of pulse of the emission unit.

9. A method of enhancing user recognition in a digital image processor, wherein the digital image processor comprises a detecting unit comprising an emission unit for emitting light disposed at one side of a view finder and a light receiving unit for receiving light reflected by a user, the method comprising:
   sensing rotation of the digital image processor;
   increasing time for emitting light from the emission unit when the rotation is sensed by the sensing unit; and
   controlling power supply to a display unit based on an output value corresponding to an amount of incident light onto the light receiving unit.

10. The method of claim 9, wherein the sensing of the rotation is performed in a rotation sensor.

11. The method of claim 9, wherein in the controlling, the time for emitting light from the emission unit increases by increasing pulse numbers of the emission unit or duty ratio of pulse of the emission unit, or shortening frequency of pulse of the emission unit.

12. The method of claim 9, wherein a maximum recognition distance of the detecting unit is controlled based on the output value corresponding to an amount of incident light onto the light receiving unit.

13. A digital image processor comprising a view finder for a user to view a subject and a display unit on which an image is electrically realized, the digital image processor comprising:
- a sensing unit for sensing rotation of the digital image processor;
- a detecting unit disposed at one side of the view finder and comprising an emission unit for emitting light and a light receiving unit for receiving light reflected by the user; and
- a control unit for increasing time for emitting light from the emission unit when rotation is sensed by the sensing unit and controlling power supply to the display unit based on an output value corresponding to an amount of incident light onto the light receiving unit,
- wherein a maximum recognition distance of the detecting unit is controlled based on the output value corresponding to an amount of incident light onto the light receiving unit.

* * * * *